Sept. 17, 1935.  R. A. HASKELL  2,014,566
BIMETALLIC ARTICLES OF MANUFACTURE
Filed May 27, 1931
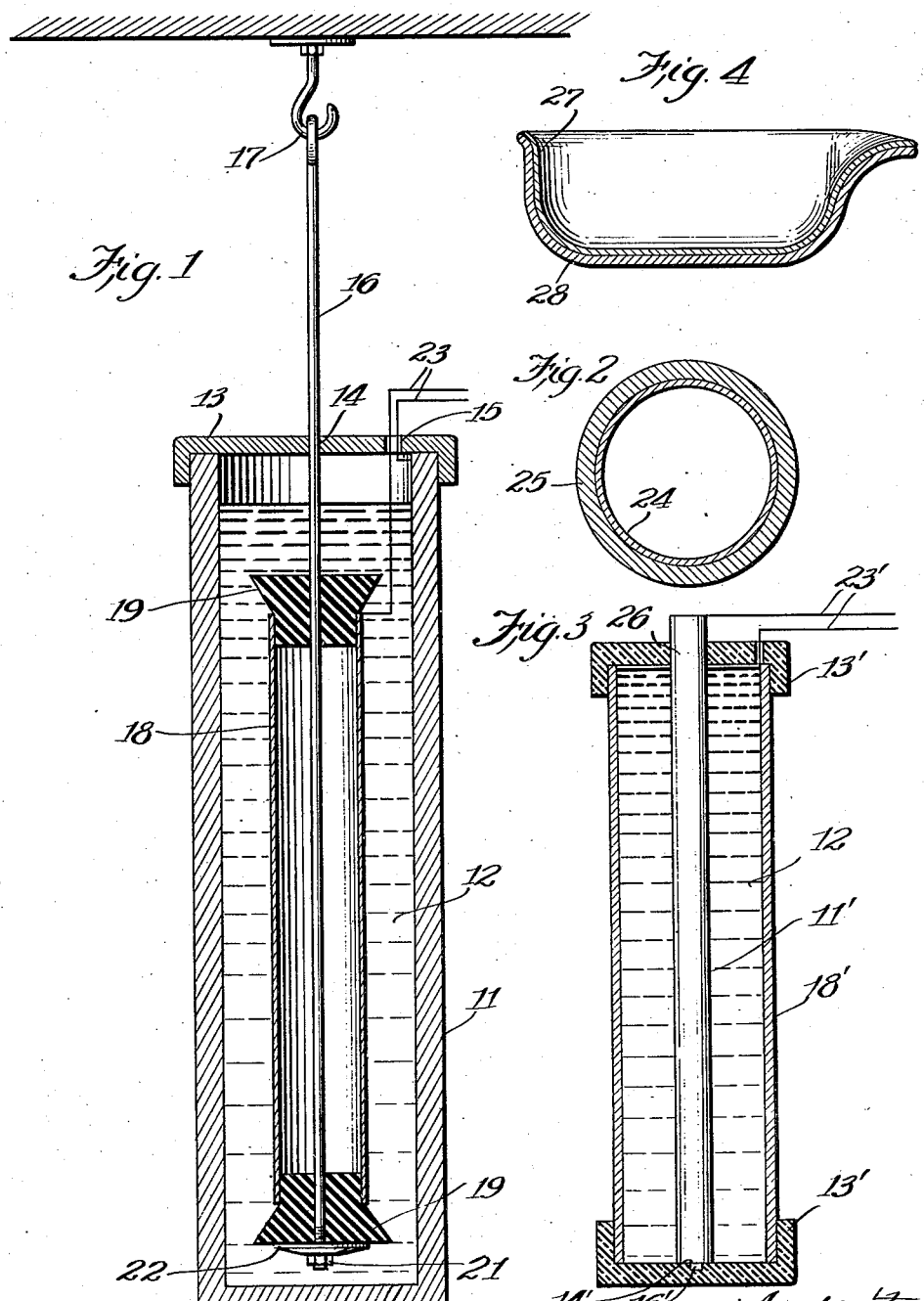

Patented Sept. 17, 1935

2,014,566

UNITED STATES PATENT OFFICE 2,014,566

BIMETALLIC ARTICLES OF MANUFACTURE

Roy Arthur Haskell, Waukegan, Ill., assignor to Fansteel Products Company, Inc., North Chicago, Ill., a corporation of New York Application May 27, 1931, Serial No. 540,319

2 Claims. (Cl. 204—8)

This invention relates in general to bi-metallic articles of manufacture and has more particular reference to electrically fabricated bi-metallic articles of manufacture and the method of making the same.

A primary object of the invention is the production and provision of bi-metallic articles of manufacture having a difficultly platable or difficultly electrolyzable lining which serves as a form determining the final shape of the article and having a body of mechanically strong ductile material or metal conforming to the configuration of the lining.

An important object of the invention is the provision of an electrically fabricated article of manufacture which is mechanically strong and which has one side protected against corrosion and erosion.

Another important object of the present invention is to electrically fabricate an article of manufacture from a metal such, for example, as tantalum or other refractory metals, aluminum, or any other difficultly platable metal, and a strong ductile metal such, for example, as copper, silver or any other suitable base metal or alloy which may be deposited electrolytically.

A further important object of my invention is the production and provision of copper articles of manufacture having a corrosion, erosion and acid resisting lining which may be economically manufactured and which are characterized by the strength, electrical and thermal conductivity and other physical, chemical and electrical properties of copper, and by the hardness, durability, corrosive, erosive and acid resisting properties of tantalum.

Other objects and advantages will appear more fully from the following description and from the accompanying drawing in which similar characters of reference indicate similar parts throughout the several views.

In the drawing:

Fig. 1 is a sectional view illustrative of a step in the novel method of the invention.

Fig. 2 is a sectional view of a bi-metal article of manufacture embodying the features of the invention.

Fig. 3 is a view similar to Fig. 1, illustrative of a method of reinforcing a non-corrosive article of manufacture, and Fig. 4 is a sectional view of a vessel or crucible formed in accordance with the novel method of the invention.

Valve metals, such for example, as tantalum and aluminum, are considered non-platable and non-electrolyzing. The refractory metals such as tantalum and columbium have, however, many properties for example, hardness, durability, resistance to corrosion, erosion and acids, which are desirable but prohibitive from the standpoint of cost in such articles of manufacture as jewelry and other decorative and ornamental articles, electrodes, dental materials and the like.

It is, therefore, highly desirable to produce articles of manufacture which have the ornamental and decorative qualities of the mentioned refractory metals, and that will be durable, erosive, corrosive and acid resisting, and yet have the mechanical strength, electrical and thermal conductivity and other physical, chemical and electrical properties of a base metal such, for example as copper and silver, in order to avoid the expense of fabricating such articles entirely of the refractory metal, or attempting to alloy the greatly dissimilar materials or to solder, weld or braze such materials together.

Moreover, base metals and refractory metals cannot readily and economically be sweated together as in the case of gold and silver plates, nor is it practical or practicable to heat a base metal sheet in contact with a refractory metal sheet until the base metal becomes soft and sticky or to so heat the contacted metals and press them together, for the reason that the base metal under such condition will not wet the refractory metal nor will the union between such plates or sheets have sufficient strength to permit their use in the formation of bi-metal articles of manufacture. On the other hand it has been considered impracticable heretofore to electroplate tantalum or other refractory or valve metal sheets and subsequently form such plated sheets to the desired shape for the reason that the electroplated tantalum was not workable, and the plate did not adhere to the tantalum.

Briefly, I overcome the foregoing objections by preforming tantalum or any other refractory or valve metal material to the desired shape, utilizing this preformed tantalum as a form about which I deposit the desired thickness of any suitable strong metal which is a good thermal and electrical conductor, and which may be electrically deposited on the tantalum form.

This electrically fabricated article of manufacture, therefore, comprises a tantalum coating that may serve the dual function of protecting the article of manufacture against corrosion and erosion, lining or coating it, and a form determining the final shape of the electrolytically deposited base metal which provides an economical body or reinforcing portion that has the desirable properties of strength and thermal and electrical conductivity.

In order to accomplish the foregoing objects I provide any suitable container or vessel 11, preferably having the shape of the article desired to be made, for holding any suitable electrolytic solution 12 such as a cyanide of the metal of which the vessel 11 is formed, and with which the article is to be fabricated. In the example illustrated in Fig. 1, the vessel 11 is of copper and is cylindrical in shape. The cylindrical vessel 11 is provided with a flanged cover 13 having a central aperture 14 and a vent 15. The aperture 14 serves as a centering means for a rod 16 suspended or supported by any suitable means such as a hook 17 and extending into the electrolytic solution 12. This rod 16 carries a relatively thin article 18 of tantalum or any other suitable valve or non-corrosive metal concentrically arranged within the vessel 11 and conforming substantially to the shape thereof. As illustrated in Fig. 1, this article 18 is tantalum tubing having its ends closed by stoppers or closure members 19 of any suitable insulating material through which the rod 16, centered within the vessel 11 by means of the cover aperture 14, extends. A clamping nut and washer 21 and 22 cooperate with the free or lower end of the rod 16 adjacent the lower closure member 19 whereby the closed tantalum tube 18 is supported in the electrolyte 12.

The vent 15 in the cover 13 conveniently serves to permit supplying electrical energy from a suitable source, not shown, by means of conductors 23, to the tantalum tube 18 as a cathode and to the vessel 11 as the anode for electrolytically depositing a coating of base metal of uniform thickness about the tantalum tube 18 which electrical energy is supplied thereto by means of the leads or conductors 23. Where desired this electrolytic coating may be deposited on the tantalum form or tubing 18 so that it is thicker at one side than at the other by immersing the tube 18 in the electrolyte 12 eccentrically with respect to the vessel 11.

The desired current density is supplied to the above described electrolytic apparatus until the base metal or copper coating is built up on the tantalum form 18 to the desired thickness after which the circuit is opened and the article removed from the vessel 11.

In the particular example described above the tantalum tube or form 18 as shown in Fig. 2 will then serve as a protective lining 24 having a reinforcing or strengthening coating 25 of copper or whatever base metal and cyanide solution thereof that may have been used in the method described and disclosed in Fig. 1. Such a tubing may advantageously be used as a conduit for acids or other chemicals or fluids carrying abrasives in suspension without being attacked by acids or eroded by the abrasives due to the acid and erosion resisting properties of the tantalum. At the same time the tubing will have the strength and heat and electrical conducting properties of the copper coating, the contact between the tantalum and copper being such that the resistance to heat or electricity thereof will be negligible.

The method disclosed with reference to Fig. 1, may of course be reversed as illustrated in Fig. 3, in which a tantalum tube or form 18' is closed at each end by flanged covers or closure members 13' and carries centrally thereof a copper or other base metal rod or tube 11' centered within the tube or form 18' by means of an end lug or finger 16' receivable in and carried by a recess or depression 14' centrally of the lower cover or closure member 13'. In this case the tantalum tube or form 18' is filled with the electrolytic solution 12 into which the copper rod or tube 11' extends through a central aperture 26 in the upper closure member 13', the copper tube or rod 11' being the anode and the tantalum tube or form 18' being the cathode, and supplied with electrical energy from a suitable source not shown, by means of conductors or leads 23'.

In this embodiment of the invention as in the first case the tantalum or refractory metal serves as the form determining the final shape of the article and the base or strengthening metal is electrically fabricated or built up about or conforming with the configuration of this form.

It will, of course, be understood that the present invention is not limited to tubular articles of manufacture, but may also be advantageously practiced for the purpose of electrically fabricating bi-metal articles of manufacture of other forms or shapes, such for example as vessels, receptacles or crucibles such as I have illustrated in Fig. 4, in which the noncorrosive, acid resisting or valve metal 27 serves as a lining which is reinforced or strengthened by the base or ordinary metal 28, conforming to the configuration of the lining 27.

Where desired the refractory or lining material may be etched or scratch brushed before it is used as a form in the electrical fabricating method described above for the purpose of providing better contact between the lining and the body or base metal formed thereabout. The coating or deposited metal lies immediately adjacent the tantalum form or lining and faithfully conforms to the configuration thereof, so that the adjacent surfaces of the lining and the base metal apparently make perfect contact thereby eliminating the objectionable weaknesses of the mechanical or chemical bond such as are obtained when two metals of the classes herein described are attempted to be brazed, soldered, welded or sweated together or pressed into contact while heated to substantially the melting point of the base metal.

By the practice of my invention, chemical apparatus such as crucibles, receptacles and the like, and electro-chemicals such as electrodes as well as dental and surgical apparatus or implements, and jewelry or ornamental and decorative articles of manufacture, may be formed, which will have the strength, thermal and electrical conductivity and other properties of the base metal and at the same time a protective coating or lining of an acid erosive and corrosive resisting as well as the several properties of a metal such as tantalum, columbium or aluminum, and since the method of making such bi-metal articles of manufacture does not contemplate heating the lining or coating metal, there will be no objection from the standpoint of embrittlement when tantalum or columbium is used, due to the absorption of gases.

The novel method of my invention may be economically practiced and does not involve the use or manipulation of complicated apparatus.

It is thought that the invention and many of its attendant advantages will be understood from the foregoing description. It will be apparent that various changes may be made in the form, construction and arrangement of parts without departing from the spirit and scope of the invention or sacrificing all of its material advantages, the form hereinbefore described being merely illustrative thereof.

I claim:

1. An electrically fabricated article of manufacture comprising a base metal having a wear resistant lining of tantalum conforming to the configuration of said base metal whereby said article has the strength characteristics of said base metal.

2. A bi-metallic article comprising a relatively thin tantalum coating, and an electrolytic base metal of uniform thickness conforming to the configuration of the tantalum coating and having a wear resistant joint therewith for reinforcing the said relatively thin tantalum coating.

ROY ARTHUR HASKELL.